June 26, 1951  M. C. MILLER  2,558,308
YARN SPINDLE
Filed Nov. 6, 1946
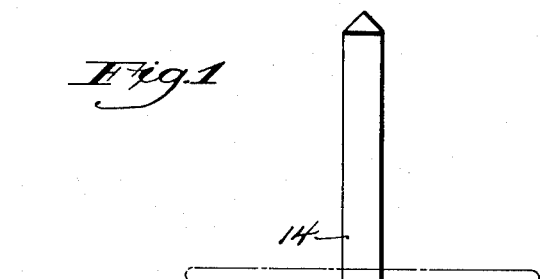
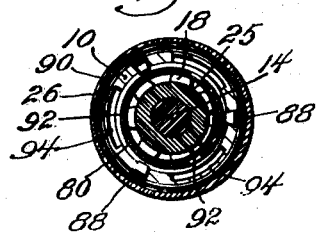
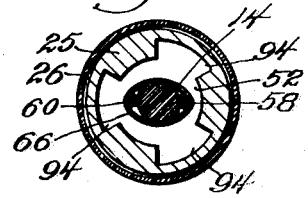
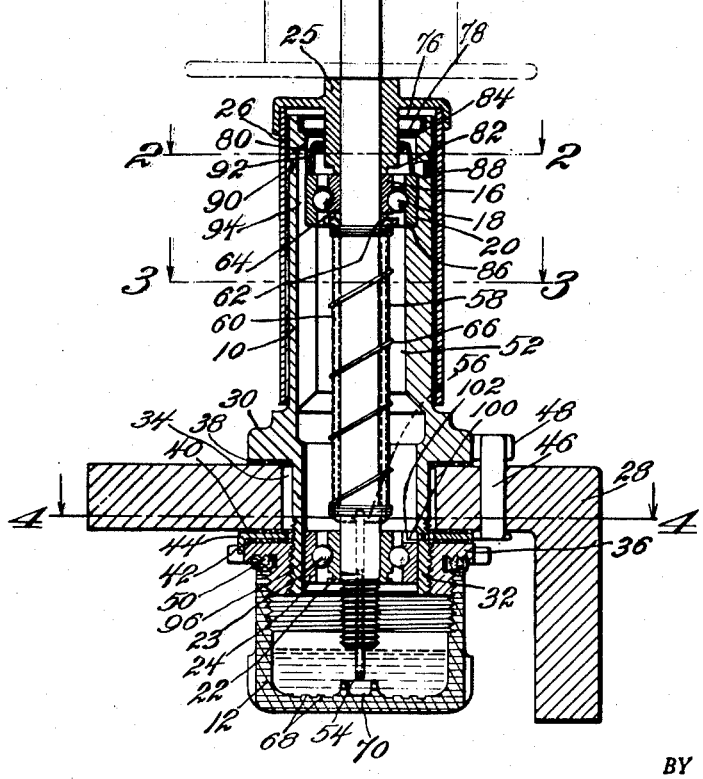
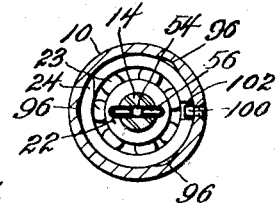
INVENTOR.
Max C. Miller
BY Maxwell Fish
Atty.

Patented June 26, 1951

2,558,308

UNITED STATES PATENT OFFICE 2,558,308

YARN SPINDLE

Max C. Miller, Cumberland, R. I., assignor to Knitting Machines Corporation, Dover, Del., a corporation of Delaware Application November 6, 1946, Serial No. 708,170

23 Claims. (Cl. 308—169)

The present invention relates to an improved vertical high speed spindle assembly of the general type employed in manufacturing processes having to do with the making and twisting of yarn, including yarn making, spinning, doubling, testing and braiding.

The invention is more particularly illustrated and described in connection with a high speed spindle assembly which comprises a vertical spindle or blade supported by spaced anti-friction bearings within a cylindrical housing which is closed at its lower end to provide a lubricant reservoir, and which is provided with self-containing means to supply lubricant continuously and in carefully regulated amounts to the bearings while the spindle is in operation.

Inasmuch as the rate of production and efficiency of manufacturing processes of the general type employing these spindles is directly proportional to the rate of rotation of the spindle and of yarn draw-off therefrom, every effort has been made to produce a spindle which will operate at the highest possible speed consistent with reasonably long life of the spindle assembly. These spindles are employed in very large numbers, and for reasons of economy must be of simple construction adapted for easy replacement of worn parts and for manufacture at low cost. Spindles of the general type referred to, are conventionally operated at speeds up to ten thousand revolutions per minute without serious difficulty, but heretofore attempts further to increase the spindle speed substantially above this level have met with little success owing to excessive vibration of the spindle assembly, increased breakage of parts including the spindle blade, greatly increased wear and failure of the spindle bearings, failure of lubrication, and similar problems which become greatly magnified as the speed of rotation is increased.

It is a principal object of the invention to provide a novel and improved high speed spindle assembly which is capable of being driven continuously at substantially higher speeds than have heretofore been considered practicable, and which may be in the order of twenty thousand revolutions and upward per minute, is of simple construction adapted for easy replacement and repair, and is capable of being manufactured in quantity and at low cost.

It is a further object of the invention to provide for the improved lubrication of the bearings of the high speed spindle assembly to insure adequate and continuous lubrication of the bearings for spindle operating speeds which may be in the order of twenty thousand revolutions and upward per minute.

It is a further object of the invention to improve the construction and arrangement of the spindle assembly in certain particulars to improve the operation and efficiency of certain of the operating parts for the more adequate control of lubricant supplied to the bearings, including means to confine and to dispose of excess lubricant supplied to the bearings, and further to shield the bearing assembly in such a manner as to prevent the possibility of entry of foreign matter including lint.

With the several objects in view as above noted, the several features of the invention consist also in the devices, combinations and arrangement of parts hereinafter described and claimed, which together with the advantages to be obtained thereby will be readily understood by one skilled in the art from the following description taken in connection with the accompanying drawing, in which Fig. 1 is a sectional view in elevation taken through the center of a vertical yarn twisting spindle assembly embodying in a preferred form the several features of the invention; Fig. 2 is a sectional plan view taken on the line 2—2 of Fig. 1; Fig. 3 is a sectional plan view taken on the line 3—3 of Fig. 1; and Fig. 4 is a sectional plan view taken on the line 4—4 of Fig. 1.

Referring specifically to the drawing, the spindle assembly illustrated, comprises a generally cylindrical housing 10 closed at its lower end by means of a cup-shaped lubricant reservoir 12, a vertically extending spindle or blade 14, and a pair of anti-friction bearings spaced from one another within the housing. The upper bearing comprises an inner race 16 carried by the blade, anti-friction balls 18 and an outer race 20 mounted in the housing, and the lower bearing comprising the inner race 22 secured to the blade, anti-friction balls 23, and an outer race 24 supported within the housing.

A feature of the invention consists in the provision of a spindle or blade in the form of a shaft which is accurately ground and trued to one diameter along its entire length. It has been found that a spindle constructed in this manner is more perfectly balanced and is stronger than spindles of the prior art having tapered or shouldered portions which tend to be out of balance, and which at the very high speeds employed form concentration points for vibration and strain, with the result that the spindle is likely to snap off during operation. The blade illustrated in the preferred form of the invention, has rigidly secured thereon the inner races of the two anti-friction bearings, and at approximately its midpoint a sleeve 25 which carries a cylindrical guard or skirt 26 arranged to extend downwardly from the outer periphery of the housing.

The two anti-friction bearings are preferably of the same size to assist in maintaining an accurate balance of the rotating mechanism, and to insure that the bearings will have approximately the same life in operation. In actual operations, anti-friction ball bearings having an outer diameter of ⅞ inch are employed. It is desirable to employ bearings of small diameter, since the rate of travel of the balls in their recesses and consequent wear within the bearing increases very rapidly for bearings of larger diameter. The outer race of the upper bearing is rigidly held in place in the housing by means of screws, while the outer race of the lower bearing is slidably supported for axial adjustment in the casing, being, however, keyed thereto to prevent rotation of the race which would tend to reduce the efficiency and life of the bearing assembly.

The housing 10 and reservoir 12 are constructed and arranged to be assembled upon a spindle supporting rail 28, being for this purpose formed with an outwardly extending base flange 30 and a downwardly extending threaded tubular portion 32 which projects through and is loosely fitted within an aperture 34 in the rail 28. The housing is secured in position by means of a nut 36 screw-threaded to the tubular portion 32 for clamping engagement against the under side of the rail 28. Gaskets 38, 40 and 42 and an interposed locking washer 44 which may be of cork or similar lubricant retaining material, are provided to insure a tight fit, and also to absorb any slight shocks or vibration incidental to operation of the spindle at very high speeds. A vertically arranged locking pin 46 passing through the rail engages at its upper end in a slotted lug 48 formed on the base flange 30, and at its lower end with a slotted extension of the locking washer 44 to lock the parts including the locking washer 44 and nut 36 in position, and to prevent rotational movement of the housing.

The lubricant reservoir 12 is screw-threaded to the outer periphery of the nut 36. In order to provide a lubricant-tight seal, the edge forming the upper end of the cup-shaped reservoir 12 is serrated, the opposed face of a flanged outward extension of the nut is similarly serrated, and a washer 50 of cork or similar material is interposed between said serrated portions to form a lubricant-tight seal between the cup-shaped reservoir 12 and nut 36.

The arrangement of the housing 10, blade 14 and supporting bearings is such as to provide a chamber 52 within the housing which is of substantial size and extends along the length of the housing to include the spaced bearings.

Lubricant is supplied to the anti-friction bearings through a novel system of conduits which operate in a novel and improved manner to draw lubricant from the reservoir, and to supply it to the bearings in a finely divided or mist-like form and in carefully regulated amounts to insure continuous lubrication of the bearing but without overloading the bearing with any excess of lubricant which would interfere with the free rolling action of the anti-friction elements of the bearings and cause excessive wear. The lubrication system is particularly constructed and arranged to operate with the greatest efficiency for spindle speeds in the order of twenty thousand revolutions per minute and upward.

For drawing the lubricant upwardly from the reservoir, there is provided a small downwardly extending tube 54 which is disposed axially of the spindle and projects into the lubricant in the reservoir. The conduit thus provided extends upwardly through the axis of the spindle to a point slightly above the level of the lower bearing, and is there connected to a cross bore 56 into which are fitted the inwardly bent lower end of two upwardly extending conduit tubes 58, 60 secured to the outer periphery of the blade. The tubes 58, 60 terminate at their upper ends in short outwardly turned nozzles which project within slots 62, 64 formed in the inner race of the upper bearing. The tubes 58, 60 thus supported at their lower end by the cross bore 56 and at their upper ends in the slots 62, 64, are held firmly in place by means of a helical spring wire holder 66 coiled about the blade 14 and tubes 58, 60. The holder 66 is formed with at least one and preferably with several complete closely wound coils at each end thereof. An extremely sturdy construction and arrangement of the lubricant supply system is thus provided, which is at the same time capable of easy replacement and repair in the event that the passages provided by the tubes 58, 60 become obstructed.

Features of the lubricant supply system above described, which have been found most advantageous for the certain supply of lubricant in closely controlled quantity to the bearings of a spindle or blade rotating at extreme speeds in the order of twenty thousand revolutions per minute and upward, include the specific arrangement of the downwardly extending tube 54 which projects into the lubricant in the reservoir. The tube 54 is preferably of small diameter to avoid the drawing of lubricant upwardly along the outside of the tube and directly into contact with the lower bearing. In order to further control the motion of the lubricant induced by the rapidlly turning tube 54, circular corrugations 68 and a centrally disposed cup 70 are provided in the bottom of the reservoir.

Further in accordance with the preferred construction, the conduits provided by tube 54 and tubes 58, 60 are formed with extremely smooth inner walls, and with an internal diameter which is preferably between thirty and eighty thousandths of an inch. With this construction, the lubricant is drawn upwardly through the tubes partly by a capillary action and partly by the sucking action produced by centrifugal force as the lubricant is thrown outwardly in the radial extensions provided by the cross bore 56.

A further feature of the lubricant supply system consists in the proportions and position of the several parts of the lubricant supply conduits. The radial offsets provided by the cross bore 56 which act by centrifugal force to draw lubricant upwardly, are preferably located substantially at or slightly above the level of the lower bearing as shown in the illustrated form of the device. Experience has shown that where the radial extensions of the conduit are located substantially above the level shown, the drawing action of the device tends to become uncertain and the risk of failure of lubrication is greatly increased. The arrangement of the improved lubricant supply system to provide relatively long upwardly extending offset portions of the supply conduit as provided by the illustrated tubes 58, 60 is of considerable importance to cause the lubricant to be drawn out by centrifugal action into a very fine film which breaks up into an extremely fine mist as it emerges from the conduit nozzle.

A further novel feature of the improved lubricant supply system shown, consists in the location of the nozzles of the device in recessed portions of the inner race, so that lubricant is supplied effectively to the anti-friction ball elements 18 of the upper bearing. As previously pointed out, the lubricant supply system illustrated, discharges lubricant into the lubricant chamber in a finely divided mist-like form which then condenses on the enclosing metal surfaces including the parts of the upper and lower anti-friction bearings. It has been found, however, that for the adequate lubrication of the upper bearing, the discharge of lubricant from the nozzles is desirably directed effectively against the anti-friction ball elements 18 of the upper bearing, so that a more rapid supply and replacement of lubricant is insured to the upper bearing than is required for the proper lubrication of the lower bearing. The load imposed upon the upper bearing during operation of the spindle is several times greater than that imposed upon the lower bearing.

Further in accordance with the invention, novel means are provided to prevent escape of lubricant or the entry of lint or other foreign matter through the upper end of the housing from which the spindle projects. In this connection, it may be noted that the lubricant supplied in the mist-like form referred to, is so finely divided that it is not readily discernible in the atmosphere, and the lubrication of the bearings is not readily visible to the naked eye. In tests made with a window cut through the wall of the spindle housing, the spindle was started in operation and a mirror was placed in the window. Only after three minutes of operation could a perceptible moisture stain be observed on the surface of this mirror. At the end of approximately twenty minutes of continuous operation of the spindle, a thin film of lubricant could be observed draining steadily downwardly along the inner wall of the housing. It will be appreciated that continuous leakage of the lubricant from the housing even in this finely divided form, cannot be tolerated, both because of the depletion of the lubricant in the reservoir which results, and because of the risk that the lubricant will come into contact with and stain or otherwise mar the appearance of the product. The high speed of rotation of the spindle tends to induce a condition of turbulence and to set up pressures within the atmosphere of the spindle housing which present a serious problem to prevent the escape of this lubricant mist from the housing.

The devices provided in accordance with the invention to prevent escape of lubricant or the entry of foreign matter through the upper end of the housing, include a lubricant cap in the form of a pair of spaced baffles 76, 78 mounted within the housing at its upper end, the cylindrical cover sleeve or skirt 26 which extends downwardly over the outer periphery of the housing, a lubricant guard 80 having a cup-shaped inner edge disposed between the upper bearing and the lubricant cap to catch the lubricant, and a lubricant slinger 82 provided by a shoulder edge of the sleeve 25 on the blade 14. The baffles 76, 78 are in the form of thin metal stampings having the outer edges bent to fit over one another, and are supported in an annular recess 84 in the upper end of the housing 10. The baffles 76, 78 are fitted at their inner edges to the rotatable blade 14 with a small clearance which may be in the order of five thousandths to twenty thousandths of an inch. Rotation of the blade 14 at high speed tends to set up an area of relatively high pressure in the space between the baffles 76, 78 which operates as an air lock to offset pressures in either direction which may be set up within the housing and serves to resist the passage of either lubricant or foreign matter past the baffles.

The sleeve 26 is fitted over the cylindrical outer periphery of the housing 10 with a very small clearance which may be in the order of ten thousandths to thirty thousandths of an inch. The small clearance provided and the substantial downward extent of the sleeve 26 combine to eliminate any suction action which might otherwise be set up by the rapidly rotating parts. The relatively long sleeve 26, closely fitted to the housing 10 and rotating at high speed with relation thereto, tends to set up a slight outward or exhaust pressure which is sufficient to prevent the lint laden room atmosphere from being drawn inside the housing, without at the same time seriously affecting the high pressure area produced between the baffles 76, 78.

The lubricant guard 80 and cooperating lubricant slinger 82 are particularly adapted to prevent the escape of lubricant which may be forced upwardly through the upper anti-friction bearing, and which would otherwise be forced also past the baffles 76, 78. The guard 80 is roughly conical in shape, and has the upper and inner edge thereof formed in the shape of an annular groove or cup to collect and condense any lubricant which may be forced upwardly against the guard 80 by the currents generated by the rotating blade. The guard 80 is fitted to the blade 14 with a small clearance, which may be in the order of five thousandths to twenty thousandths of an inch. The guard 80 at its lower edge rests upon the outer race of the upper bearing, which is in turn supported on an annular ledge 86 formed in a periphery of the housing. Three locking screws 88, threaded into the housing, are adapted to bear against the guard 80 and race 20 to lock these parts in position. A locking wire 90 passing around the outer periphery of the housing, serves as a checking device to prevent the backing out of the screws. A series of perforations 92 are provided in the guard 80 at approximately the level of the lubricant slinger 82, provided by the shoulder edge of the sleeve 25, so that lubricant which is condensed and collected on the slinger will be thrown outwardly through the perforations clear of the anti-friction elements or balls 18 of the upper bearing.

Further in accordance with the invention, the spindle assembly of the illustrated construction has embodied therein means for returning outside the bearings any excess lubricant supplied to the bearings, or which has condensed from the lubricant mist supplied to the chamber 52. The provision of such return means has been found to substantially improve the condition of supply of lubricant to the bearings, prevents the building up of excessively heavy oil filaments within the bearing races, and has the effect of substantially increasing the life of the bearings at the extreme speed of spindle rotation here employed. For the return of lubricant which has been condensed and thrown outwardly through the perforations 92 of the lubricant guard 80, three downwardly extending channels or grooves 94 are formed in the inner periphery of the housing 10 which bypass the returning lubricant outside the outer race 20 of the upper bearing. Similar downwardly extending channels 96 are provided in the lower portion of the inner periphery of the housing 10 for by-passing the lubricant outside the outer race 24 of the lower bearing. The grooves or cavities 94 are extended downwardly along that portion of the inner peripheral wall of the housing which forms the lubricant chamber 52 and serve as convenient passages to facilitate the downward movement of lubricant condensed on the wall of the housing. Further in accordance with the invention, the grooves 94 formed in the inner peripheral wall of the chamber 52 are of relatively large size and provide means to separate out and to collect any excess lubricant which may be precipitated out of the mist-like atmosphere within the housing, and thus help to maintain a finely divided mist-like consistency of the lubricant in the chamber for the lubrication of the bearings.

In accordance with a feature of the invention, the outer race 24 of the lower bearing is supported in the housing 10 in such a manner as to permit axial movement of the race 24 in the housing for adjustment of the bearings to any relative contraction or expansion of the blade 14 and housing 10. A key 100 and keyway 102 are provided for keying the outer race 24 against possible rotation with the blade 14, while permitting axial movement of the race in the housing.

The blade 14 may be driven by any form of power drive capable of producing spindle speeds in the order of twenty thousand revolutions and upward a minute as, for example, by means of a belt which rides against the sleeve 26.

It will be understood that the invention is not limited to the specific embodiment shown, and that various deviations may be made therefrom without departing from the spirit and scope of the appended claims.

What is claimed is:

1. In a high speed vertical spindle assembly, a vertical rotary spindle, upper and lower anti-friction bearings having inner and outer races and interposed anti-friction elements, said bearings being spaced from one another on the spindle, a housing adapted to receive said bearings and having the internal periphery thereof spaced from the spindle to provide a lubricant mist chamber including said bearings, a lubricant reservoir disposed at the lower end of the housing, and means for supplying lubricant in mist form to the bearings comprising a smooth wall conduit extending axially downwardly into said lubricant, an outward extension of said conduit in the vicinity of the lower bearing, and an upward extension of said conduit offset from the axis of the spindle and having at its upper end an outlet nozzle disposed above the lower edge of the upper bearing, the inner race of said upper bearing being recessed to provide a lubricant passage from the nozzle to the anti-friction elements of said upper bearing.

2. In a high speed vertical spindle assembly, a vertical rotary spindle, upper and lower anti-friction bearings having inner races spaced from one another and secured directly on the spindle, a housing adapted to receive said bearings and having the internal periphery thereof spaced from the spindle to provide a lubricant mist chamber including said bearings, a lubricant reservoir disposed at the lower end of the housing, and means for supplying lubricant in mist form to the bearings comprising a smooth wall conduit extending axially downwardly into said lubricant, an outward extension of said conduit in the vicinity of the lower bearing, and an upward extension of said conduit extending along the periphery of the spindle and having at its upper end an outlet nozzle closely adjacent the under edge of the upper of said bearings.

3. In a high speed vertical spindle assembly, a vertical rotary spindle, upper and lower anti-friction bearings having inner races spaced from one another and secured directly on the spindle, a housing adapted to receive said bearings and having the internal periphery thereof spaced from the spindle to provide a lubricant mist chamber including said bearings, a lubricant reservoir disposed at the lower end of the housing, and a smooth wall conduit of internal diameter along its length between thirty and eighty thousandths of an inch for supplying lubricant in mist form to the bearings comprising an inlet tube extending axially downwardly into said lubricant, an outward extension of said conduit in close proximity to and above the lower bearing, and an upward extension of said conduit in the form of a tube extending along the periphery of the spindle and having at its upper end an outlet nozzle closely adjacent the under edge of the upper of said bearings.

4. In a high speed vertical spindle assembly, a vertical rotary spindle, a pair of upper and lower anti-friction bearings spaced from one another on the spindle, a housing adapted to receive said bearings and having the internal periphery thereof spaced from the spindle to provide a lubricant mist chamber including said bearings, a lubricant reservoir disposed at the lower end of the housing, and means for supplying lubricant in mist form to the bearings comprising a conduit extending axially downwardly from the spindle into said lubricant, an outward extension of said conduit in the vicinity of the lower bearing, and a tube extending along the periphery of the spindle and forming an upward extension of the conduit offset from the axis of the spindle and having at its upper end an outlet nozzle closely adjacent the upper of said bearings.

5. In a high speed vertical assembly, a vertical rotary spindle, upper and lower anti-friction bearings having inner and outer races and interposed anti-friction elements, the inner race of said upper bearing having the lower edge thereof recessed to provide a lubricant passage to the anti-friction elements supported thereby, said bearings being spaced from one another on the spindle, a housing adapted to receive said bearings and having the internal periphery thereof spaced from the spindle to provide a lubricant mist chamber including said bearings, a lubricant reservoir disposed at the lower end of the housing, a conduit for supplying lubricant in mist form to the bearings comprising an inlet tube extending axially downwardly from the spindle into the lubricant, an outward extension of said conduit in close proximity to and above the lower bearing, and an upward extension of the conduit in the form of a tube having the lower end thereof bent inwardly to be fitted into said outward extension and at the upper end thereof an outlet nozzle arranged to extend into the recessed lower edge of the upper of said bearings, and an encircling holder for securing the tube to the spindle.

6. In a high speed vertical spindle assembly, a vertical rotary spindle, a pair of upper and lower anti-friction bearings spaced from one another on the spindle, a housing adapted to receive said bearings and having the internal periphery thereof spaced from the spindle to provide a lubricant mist chamber including said bearings, a lubricant reservoir disposed at the lower end of the housing, and a conduit for supplying lubricant in mist form to the bearings comprising an inlet tube extending axially downwardly into said lubricant, oppositely disposed radial extensions of said conduit above the lower of said bearings, and a pair of tubes extending longitudinally along opposite sides of the spindle and secured to the external periphery thereof forming upward extensions of said conduit having at their upper ends outlet nozzles closely adjacent the under edge of the upper of said bearings.

7. In a high speed vertical spindle assembly, a vertical rotary spindle, a pair of upper and lower anti-friction bearings with inner and outer races spaced from one another on the spindle, a housing adapted to receive said bearings and having the internal periphery thereof spaced from the spindle to provide a lubricant mist chamber including said bearings, a lubricant reservoir disposed at the lower end of the housing and with the lubricant level thereof substantially below the spindle, a smooth wall conduit of internal diameter between thirty and eighty thousandths of an inch for supplying lubricant in mist form to the bearings, comprising an inlet tube extending axially downwardly into said lubricant from the spindle, outward extensions of said conduit adjacent to and above the lower of said bearings, and tubes connecting with each of said outward extensions forming upward extensions of said conduit disposed at equally spaced intervals about the periphery of the spindle and having at their upper ends outlet nozzles disposed adjacent the under edge of the upper of said bearings, and supporting means for said tubes including recessed portions of said spindle assembly into which the respective tubes are fitted, and an encircling holder for securing said tubes in position on the spindle.

8. In a high speed spindle assembly, the combination of a vertical rotary spindle, anti-friction bearings spaced from one another on the spindle, a housing adapted to receive said bearings and having the internal periphery thereof spaced from the spindle to provide a lubricant mist chamber including said bearings, a lubricant reservoir disposed at the lower end of the housing, a conduit for supplying lubricant in mist form to said bearings comprising an inlet portion extending axially of the spindle and arranged to be immersed in the lubricant, an outward extension of said conduit in the vicinity of the lower bearing and an upward extension of said conduit offset from the axis of the spindle and having at its upper end an outlet nozzle at the under side of the upper of said bearings, and means to return lubricant condensed from said bearings from the upper end of said chamber outside the bearings.

9. In a high speed spindle assembly, the combination of a vertically disposed rotary spindle, a housing having the inner wall face thereof separated from the spindle to provide a lubricant mist chamber including said bearings, spaced anti-friction bearings having inner races secured to the spindle and outer races carried on the inner wall of said housing, means to supply lubricant in mist form to the bearings, a closure for the lower end of the housing providing a lubricant reservoir, and lubricant conducting channels formed in the inner wall face of the housing bypassing said bearings to the reservoir.

10. In a high speed spindle assembly, the combination of a vertical rotary spindle, anti-friction bearings spaced from one another on the spindle, a housing adapted to receive said bearings and having the internal wall face thereof spaced from the spindle to provide a lubricant mist chamber including said bearings, a lubricant reservoir disposed at the lower end of the housing, means for supplying lubricant in mist form to said bearings including an outlet located in the vicinity of the upper of said bearings, means to prevent the escape of lubricant between the housing and spindle located above the upper of said bearings, and longitudinally extending grooves in the internal wall face of the housing between the bearings and channels passing outside said bearings adapted to return lubricant condensed from said bearings and chamber to the reservoir.

11. In a high speed spindle assembly, the combination of a vertical rotary spindle, anti-friction bearings spaced from one another for supporting the spindle, a housing adapted to receive said bearings and to provide a lubricant chamber extending lengthwise of the spindle having the internal periphery thereof spaced from the spindle to provide a lubricant mist chamber including said bearings, a lubricant reservoir disposed at the lower end of the housing, means to supply lubricant from the reservoir to the chamber and bearings, an end cap supported from the housing having spaced flanges surrounding the spindle to prevent escape of lubricant between the spindle and housing, a lubricant guard supported from the housing comprising a flange element closely fitted about the spindle between the upper bearing and end cap, a slinging shoulder on the spindle between the lubricant guard and upper bearing, and means to return lubricant condensed on the internal periphery of said chamber externally of the bearings.

12. In a high speed spindle assembly, the combination of a vertical rotary spindle, anti-friction bearings spaced from one another on the spindle, a housing adapted to receive said bearings and having the internal wall face thereof spaced from the spindle to provide a lubricant mist chamber including said bearings, a lubricant reservoir disposed at the lower end of the casing, means for supplying lubricant in mist form to said bearings including a conduit disposed axially of the spindle with a portion thereof offset from said axis and an outlet nozzle disposed adjacent the upper of said bearings, means to return lubricant condensed on the wall face of the housing to the reservoir externally of said bearings, means to prevent escape of lubricant from the upper end of the housing comprising a lubricant guard on the housing having a flanged portion thereof fitted closely about the spindle above the upper bearing, and a lubricant slinging shoulder on the spindle between the guard and upper bearing.

13. In a high speed spindle assembly, the combination of a vertical rotary spindle, anti-friction bearings spaced from one another on the spindle, a housing adapted to receive said bearings and having the internal wall face thereof spaced from the spindle to provide a lubricant mist chamber including said bearings, a lubricant reservoir disposed at the lower end of the casing, means for supplying lubricant in mist form to said bearings including a conduit disposed axially of the spindle with a portion thereof offset from said axis and an outlet nozzle disposed adjacent the upper of said bearings, means to return lubricant condensed on the wall face of the housing to the reservoir externally of said bearings, means to prevent escape of lubricant from the upper end of the housing comprising a plurality of flanges supported from the housing above the upper bearing separated from one another and closely fitted about the spindle to prevent escape of lubricant between the spindle and housing, and a slinging shoulder on the spindle between said flanges and upper bearing.

14. In a high speed spindle assembly, the combination of a vertical rotary spindle, anti-friction bearings spaced from one another for supporting the spindle, a housing adapted to receive said bearings and to provide a lubricant chamber extending lengthwise of the spindle having the internal periphery thereof spaced from the spindle to provide a lubricant mist chamber including said bearings, a closure providing a lubricant reservoir at the lower end of the housing, means to supply lubricant from the reservoir to the chamber and bearings in mist form including a conduit from the reservoir passing upwardly through the spindle and including an outlet nozzle closely adjacent the upper of said bearings, a lubricant guard supported in the housing and having a cupped inner edge closely adjacent the spindle above the upper of said bearings, a lubricant slinging shoulder disposed on the spindle between the upper bearing and the cupped inner edge of said guard, and means to return lubricant condensed on the internal periphery of said chamber to the reservoir externally of the bearings.

15. In a high speed spindle assembly, the combination of a vertical rotary spindle, anti-friction race bearings spaced from one another on the spindle, a cylindrical housing adapted to receive said bearings and providing an oil mist chamber extending lengthwise of the spindle and including said bearings, a lubricant reservoir disposed at the lower end of the housing, means to supply lubricant from said reservoir in mist form to said bearings, an end cap having spaced flanges surrounding the spindle to prevent escape of lubricant between the spindle and housing, an upwardly extending lubricant guard having a cupped inner edge adjacent the spindle disposed on the housing between the upper of said bearings and the cap and perforated to permit escape of lubricant therethrough, a shoulder on the spindle arranged to condense and to throw lubricant through said perforations, and means to return lubricant passing through said perforations to the reservoir externally of the race bearings.

16. In a high speed spindle assembly, the combination of a vertical rotary spindle, anti-friction race bearings spaced from one another on the spindle, a cylindrical housing adapted to receive said bearings and to provide a lubricant mist chamber extending lengthwise of the spindle and including said bearings, a lubricant reservoir disposed at the lower end of the housing, means to circulate lubricant from the reservoir and supply it in mist form to the bearings, means to prevent escape of lubricant between the spindle and the housing comprising an upwardly extending perforated lubricant guard secured to the housing above the upper bearing and having a cupped inner edge adjacent the spindle, a shoulder on the spindle arranged to condense and to throw lubricant through said perforations, and means to return excess lubricant passing through said perforated guard to the reservoir externally of said race bearings.

17. In a high speed spindle assembly, the combination of a vertical rotary spindle, anti-friction race bearings spaced from one another on the spindle, a cylindrical housing adapted to receive said bearings and to provide a lubricant mist chamber extending lengthwise of the spindle and including said bearings, a lubricant reservoir disposed at the lower end of the housing, means to circulate lubricant from the reservoir and supply it in mist form to the bearings, an end cap on the housing having spaced flanges closely fitted to the spindle, a sleeve member mounted on the spindle and extending downwardly over said cylindrical housing, an upwardly extending perforated lubricant guard having a cupped inner edge adjacent the spindle disposed on the housing between the upper of said bearings and the cup, a shoulder on the spindle arranged to condense and to throw lubricant through said perforations, and longitudinally extending channels formed in the internal periphery of the housing and passing outside said race bearings adapted to return lubricant condensed from said bearings and chamber and from the outside of said guard.

18. In combination with a vertically arranged high speed spindle, a housing, a bearing assembly including spaced bearings for the spindle within the housing, said housing having the internal wall face thereof separated from the spindle to provide a mist chamber extending lengthwise of the spindle and including said bearings, a closure to the bottom of said housing providing a lubricant reservoir, means for supplying lubricant in mist form to said bearings, channels to return lubricant condensed on the internal wall face of said chamber to the reservoir externally of the bearings, a hub on the spindle above the upper of said bearings having a sharply angled shoulder, a relatively stationary annular lubricant guard closely fitted to said spindle and having openings opposite the angle of said shoulder for the passage of excess lubricant, and means to form an air baffle between the interior and exterior of said housing.

19. In combination with a vertically arranged high speed spindle, a housing, a lubricant reservoir providing a closure to the bottom of said housing, spaced bearings for the spindle within the housing, said housing having the internal wall face thereof separated from the spindle to provide a mist chamber extending lengthwise of the spindle and including said bearings, means for circulating lubricant from said reservoir and supplying it in mist form to said bearings, channels to return lubricant condensed on the internal wall of said chamber to the reservoir externally of said bearings, a hub on said spindle above the upper of said bearings having a sharply angled shoulder, a relatively stationary annular lubricant guard closely fitted to said spindle and having openings opposite the angle of said shoulder for the passage of excess lubricant, and two flanges in the housing above said guard having a close clearance between their inner edges and said hub forming an air baffle of higher pressure air between the interior and exterior of said housing.

20. In combination with a vertically arranged high speed spindle, a housing, a lubricant reservoir providing a lubricant-tight closure to the bottom of said housing, spaced bearings for the spindle within the housing, said housing having the internal wall face thereof separated from the spindle to provide a mist chamber extending lengthwise of the spindle and including said bearings, means for supplying lubricant from said reservoir in mist form to said bearings, a hub on said spindle above an upper bearing having a sharply angled shoulder, a relatively stationary annular lubricant guard closely fitted to said spindle and having openings opposite the angle of said shoulder for the passage of excess lubricant, lubricant conducting channels in the inner wall of said housing by-passing said bearings, and two flanges on the housing above said guard having a close clearance between their inner edges and said hub forming an air baffle of higher pressure air between the interior and exterior of said housing.

21. In a high speed spindle assembly, the combination of a vertically arranged high speed spindle, a housing, spaced antifriction bearings for the spindle within the housing, said housing having the internal wall face thereof separated from the spindle to provide a mist chamber extending lengthwise of the spindle and including said bearings, a lubricant reservoir forming a closure for the bottom of the housing, means to circulate lubricant from the reservoir to said bearings in mist form, means to return lubricant condensed on the chamber wall to the reservoir externally of said bearings, means closing the upper end of said housing comprising a sharply angled hub on said spindle above the upper bearing, a relatively stationary close fitting annular lubricant guard surrounding the spindle and having openings opposite the angle of said hub for the passage of excess lubricant thrown therefrom, a pair of flanges secured to the housing above said guard and closely fitted to the spindle to provide an air pressure lock, and a sleeve shielding member extending downwardly over the housing having a closed upper end thereof secured to the spindle and providing a small clearance between the sleeve and the housing.

22. In a high speed spindle assembly, the combination of a vertical rotary spindle, anti-friction bearings spaced from one another for supporting the spindle, a housing adapted to receive said bearings and providing a lubricant chamber extending lengthwise of the spindle and having the internal periphery thereof spaced from the spindle to provide a lubricant mist chamber including said bearings, a closure providing a lubricant reservoir at the lower end of the housing, longitudinally extending grooves in the wall face of said housing for returning excess lubricant condensed on said wall to the reservoir externally of the bearings, and an aperture at the upper end of the housing through which the spindle extends, a lubricant supply conduit comprising an inlet tube extending axially downwardly from the spindle into the lubricant, an outward extension of said conduit in close proximity to the lower bearing, and an offset upward extension of the conduit having at its upper end an outlet nozzle in the vicinity of the upper of said bearings, a pair of flanged elements above the bearings closely fitted to the spindle and forming an air baffle, a cupped lubricant guard closely fitted to the spindle, and an outer guard supported from the spindle and extending downwardly over the outer periphery of the housing.

23. A vertical high speed spindle assembly comprising a vertically arranged rotary spindle, a pair of spaced anti-friction bearings for the spindle having inner and outer races, a cylindrical housing having the upper and central inner peripheral portions thereof formed with large vertically extending grooves, and the lower inner peripheral portion formed with small grooves to receive the outer race of the lower bearing, an annular seat in said upper peripheral portion to receive the outer race of the upper bearing, a lubricant reservoir forming a closure for the lower end of the housing, means to prevent the escape of lubricant from the upper end of the housing past the spindle, and means to circulate lubricant from the reservoir to the bearings.

MAX C. MILLER.

REFERENCES CITED

The following references are of record in the file of this patent:

UNITED STATES PATENTS

| Number | Name | Date |
| --- | --- | --- |
| 501,408 | Draper | July 11, 1893 |
| 1,180,338 | Sumanzik | Apr. 25, 1916 |
| 1,630,712 | Meder | May 31, 1927 |
| 1,964,140 | Raible | June 26, 1934 |

FOREIGN PATENTS

| Number | Country | Date |
| --- | --- | --- |
| 228,417 | Great Britain | Feb. 5, 1925 |
| 467,478 | Great Britain | June 17, 1937 |